March 26, 1968  G. PETERSEN ETAL  3,375,058
APPARATUS AND METHOD FOR SEPARATING SUSPENDED
SUBSTANCES FROM GAS CURRENTS
Filed June 25, 1963
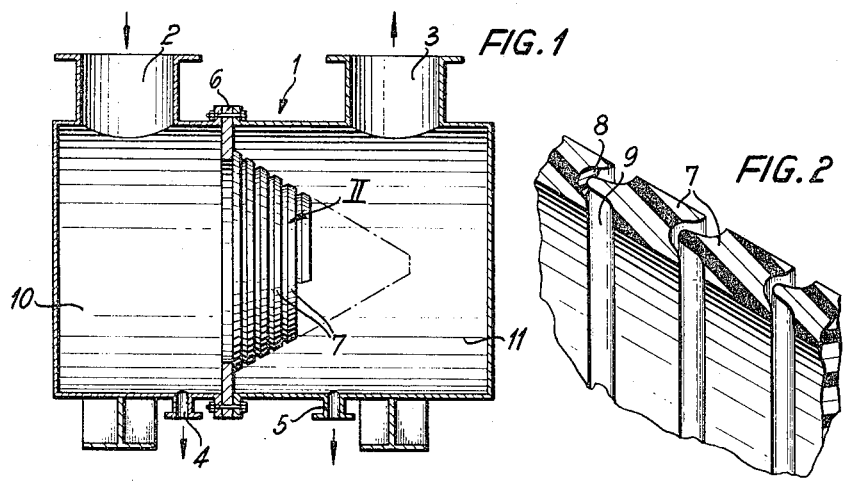
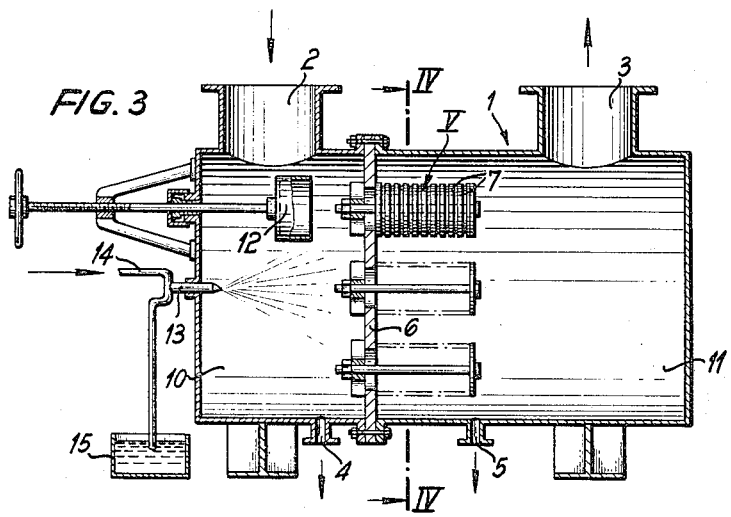
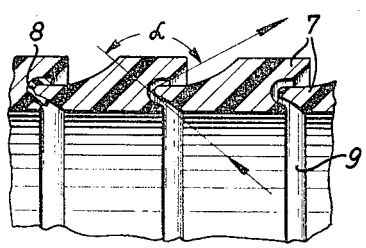
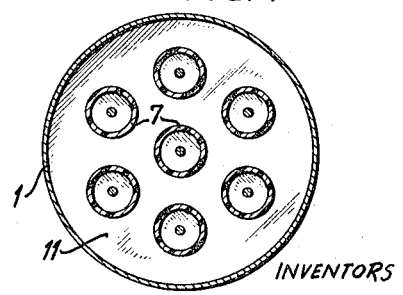
INVENTORS
GERD PETERSEN,
VOLKER FATTINGER,
WALTER JÄGER
BY: McGlew and Toren
ATTORNEYS

United States Patent Office 3,375,058
Patented Mar. 26, 1968

3,375,058
APPARATUS AND METHOD FOR SEPARATING SUSPENDED SUBSTANCES FROM GAS CURRENTS
Gerd Petersen, Wiesbaden-Sonnenberg, and Volker Fattinger and Walter Jäger, Wiesbaden, Germany, assignors to Firma Hugo Petersen, Wiesbaden, Germany, a corporation of Germany
Filed June 25, 1963, Ser. No. 290,364
Claims priority, application Germany, June 28, 1962, P 29,708; Mar. 27, 1963, P 31,454
16 Claims. (Cl. 23—2)

This invention relates to the separation of suspended substances from gas currents and, more particularly, to a novel method of and apparatus for separating fine liquids and solids from gasses in a highly efficient manner.

A known arrangement for cleaning gases involves subjecting the gases to the action of centrifugal force by directing the gases to flow through devices which force the gases to change course abruptly or reverse their direction of flow. Such devices may use, for example, deflecting bars having a V-, U- or semi-circular cross section with at least two mutually staggered rows of bars arranged in series in the direction of flow. The dimensions of these profiles are sufficient that the inner surface thereof, against which droplets are thrown by centrifugal force, may be covered with felt, wool, or other liquid absorbing materials.

To precipitate very fine droplets, such as mists, porous filter layers frequently are used. In particular, in the sulfuric acid industry, filter candles of ceramic material having a pore diameter of 0.1 mm. to 0.3 mm. are used.

It is also known to use dense wire mats, sometimes referred to as "knitted wire." Combinations of wire and glass are also used if fine mists are to be separated and, if a very low final count in the waste gas is necessary, it is necessary to use relatively dense filter layers. If the gas also contains solid substances in addition to liquids which can flow off the filter layers, the filter layers will be clogged after some time in use and can be cleaned only with great difficulty. Despite this disadvantage, these filter layers are used widely because no other arrangement is so inexpensive or effective.

An object of the present invention is to provide apparatus for the mechanical separation of suspended substances, such as mists or dusts, from gas currents, wherein the particle size of the mist or dust is in the range of $1 \cdot 10^{-4}$ cm. in diameter or less, and which particles cannot be separated with most of the known dry or wet separators.

A further object of the invention is to effect such separation of very small particles utilizing only the pressure energy of the gas current to achieve effective purification of the gas. The energy for separation of the suspended substances may be derived from the pressure drop of the gas in its path through the separator, and the invention apparatus utilizes a pressure differential of at least 50 mm. water column.

By pressure jump or pressure differential is meant a value which represents the difference of the static pressure of the gas to be cleaned before and after precipitation of the suspended substances, and such differential pressure can be expressed, for example, in millimeters of water column. The higher the pressure differential, the higher will be the purity of the emerging gas.

A particular advantage of apparatus according to the invention is that there are no moving parts. The energy expended can be produced by blowers, for example, as in cyclones. In many cases, the energy requirements are not greater than the energy requirements of an electrical precipitator for effecting the same result. However, the capital costs, size and weight of the invention apparatus are only fractions of the corresponding values for an electrical precipitator.

In accordance with the invention, it has been found that, when the same energy as expended in known mechanical apparatus is expended in apparatus which enforces only a single sharp deflection of the gas current, a better separation is achieved than is possible in porous layers or baffle-type apparatus wherein the gas is subjected to several pressure consuming directional changes.

Apparatus according to the invention and operating with a single change of direction of the gas current can be so designed that clogging is avoided, since solid particles will flow off together with liquid condensate. If the gas contains too small a proportion of liquid, a suitable liquid may be added before filtration or separation.

A further object of the invention is to provide a method for separating suspended substances from gas currents.

It has been found, rather surprisingly, that it is possible, utilizing apparatus embodying the invention, not only to precipitate sulfuric acid and similar mists and to separate them from gas currents with known separators, but also to separate other mists and dusts from gas currents, the removal of the latter from the gas current having hitherto presented a particularly difficult problem for removal from the gas current. Thus, in accordance with the invention, and utilizing the method and apparatus of the invention, it is possible to clean gases containing radio-active suspended substances, such as concentrated uranium, or pyrophoric uranium carbide, to an extent such that the radioactivity of the cleaned gas is of the order of $10^{-11}$ microcuries per cubic centimeter or less.

In further accordance with the invention, it has been found that the invention method and apparatus makes possible the cleaning of waste gases containing dusts which have been formed by cooling of gaseous substances. Thus, the method and apparatus of the invention are particularly applicable to waste gases from metallurgical plants, for example, such as a smelting plant in which aluminum waste or other like metal is smelted in gas fired tubular rotary furnaces.

The waste gases produced in such a metallurgical plant contain metal and salt vapors, and the metal or salt, upon cooling, forms an extremely fine dust.

Dust produced from gaseous substances by the addition of a reaction gas, such as the acid waste gases of a pickling plant, to which gaseous ammonia is added ahead of the washing tower to convert the acid particles to ammonium salts, also have a very small particle size. Such gases may be cleaned with the method of the invention after injecting a suitable liquid thereinto.

In accordance with a basic principle of the invention, apparatus for separating suspended substances, utilizing a pressure differential of at last 50 mm. of water column in the gas current, comprises one or more hollow bodies formed of juxtaposed closed or annular structural units, which are positioned in the gas current and which bodies are so arranged that slits are left free between adjacent annular structural elements. These slits have a formation such as to effect a change of direction in their axial sections so that passage of the gas current through the slits on a rectilinear path is impossible. The directional change in the slits should be at least 30°, and preferably more than 45°. In a preferred embodiment of the invention, the directional change in the axial section is more than 90° and preferably about 120°.

The separating action of apparatus embodying the invention is based upon the fact that, when the gas passes through the various slits of the apparatus, the suspended substances undergo a high centrifugal acceleration due to the directional change, so that mist droplets coagulate and are thrown against the walls or surfaces of the slits, where they are separated from the gas current. In order to insure an effective separation of the suspended substances, the slits should have a width, transverse to the direction of flow, of less than 5 mm. and preferably less than 2 mm. Experience has shown that a particularly advantageous range of slit width, in particular with mists or dusts that are difficult to separate, is between 0.3 mm. and 2 mm. It is important, for optimum separation, that the axial section of the slits has a cross sectional constriction at the point of the greatest curvature, for example, from the entrance to the point of greatest curvature a converging or diffusor-like constriction and from this point to the exit a diverging diffusor-like extension.

An important feature of the invention is the design of the hollow bodies which are traversed by the gases and which are preferably ring-shaped or annular. They can be mass produced of any suitable material, taking into account the chemical nature of the suspended substances to be separated. Thus, they may be metal, such as iron, steel, particularly stainless steel, light metal, brass, and bronze, and also may be of organic material such as pourable, extrudable, or moldable plastics. These elements are assembled to form the hollow bodies by inserting spacers therebetween corresponding to the desired slit width. When the hollow body is in the form of a cylinder, it has the great advantage that the slits have very long lengths while, on the other hand, the ring or other prismatic elements preserve their exact shape even with relatively large diameters and do not sag, for example as would be the case with rod-shaped elements of relatively great length. This rigidity of the ring-shaped or annular elements is of great importance, as it insures that the slits defined thereby maintain their exact width over their entire length and throughout the entire axial length of the hollow bodies. Consequently, the suspended substances are subjected to the same centrifugal acceleration in all parts of the slit, the centrifugal acceleration being due to the directional change, thus preventing short circuiting at points having a greater slit width. The narrower the slits, the better is the precipitation of the suspended substances. Fine suspended substances require slit widths of less than 2 mm., and extremely fine suspended substances require widths of between 0.3 and 1.2 mm.

For an understanding of the principles of the invention, reference is made to the following description of typical embodiments thereof as illustrated in the accompanying drawings.

In the drawings:

FIG. 1 is an axial sectional view through one form of apparatus embodying the invention;

FIG. 2 is an enlarged detail sectional view of a portion of FIG. 1;

FIG. 3 is a longitudinal sectional view through another form of apparatus embodying the invention;

FIG. 4 is a section taken on the line IV—IV of FIG. 3; and

FIG. 5 is an enlarged detail sectional view of a portion of FIG. 3.

In the arrangement illustrated in FIGS. 1 and 2, the apparatus may be made of an acid proof plastic. The apparatus includes an outer jacket or casing 1 having a gas inlet 2, a gas outlet 3, and condensate discharges 4 and 5. A disc 6 supports a plurality of rings 7 (FIG. 2) which are separated from each other by spacers 8 so as to provide slits 9 between adjacent rings. In the arrangement of FIG. 1, the rings 7 form a hollow conical body dividing the interior of casing 1 into two compartments 10 and 11. Compartment 10 is in communication with gas inlet 2, and compartment 11 is in communication with gas outlet 3.

As best seen in the enlargement of detail II, as shown in FIG. 2, the slits 9 are so formed that there is a sharp directional change in the flow path therethrough so that passage of the gas through the slits on a rectilinear path is impossible. Each slit has a cross sectional constriction at its point of greatest curvature, and the directional change at this point is, in the embodiment of FIGS. 1 and 2, about 90°. The slits are formed so as to have uniform changes in cross sectional flow area, in order to assure as small a pressure drop as possible, and for this reason the slit wall surfaces are also made as smooth as possible.

In the embodiment of the invention as shown in FIGS. 3, 4 and 5, parts identical to those shown in FIGS. 1 and 2 have been designated by the same reference numerals. In this embodiment of the invention, the rings are so associated as to form a cylindrical hollow body and for this reason all the rings have the same diameter. As can be best seen in the enlarged view of FIG. 5, which represents detail V of FIG. 3, there is a sharp directional change in the flow path through each slit. The angle between the entering flow direction and the exiting flow direction is indicated at $\alpha$, and the two sides forming this angle intersect at the apex of the deflection. The sides of this angle further pass through the center of the inlet and outlet portions of each slit. In FIG. 5, the angle $\alpha$ is about 120° and it will be noted that each slit has a diffusor-like uniformly converging, or decreasing area, entrance section to the point of greatest curvature, and a diffusor-like uniformly diverging exit section from the point of greatest curvature to the discharge.

In order to adapt the separator for use with varying flow volumes, closing valves 12 can be provided for some of the filter cylinders, and these valves are adjustable from outside of casing 1. With a decrease in the gas flow rate, the inlet apertures of one or more of the cylindrical hollow bodies formed by the ring 7 are closed by valves 12. In addition, a liquid atomizing nozzle 13 is provided in inlet compartment 10 and is supplied with compressed air or steam through a line 14. Such a liquid atomizing nozzle is used when the gas to be cleaned contains larger amounts of solid and relatively smaller amounts of liquid. A supply vessel for the liquid for nozzle 13 is indicated at 15.

The advantages of the invention arrangement will be apparent from the following practical examples:

*Example 1*

Concentrated uranium 235 obtained as nitrate in a solution containing hydrofluoric acid is precipitated by the addition of ammonium carbonate and ammonia. The waste gases from the reaction vessel contain very fine liquid particles due to the evolution of gas in the reaction, and this gas carries uranium particles in suspension. Using an apparatus according to the invention, and particularly according to the embodiment of FIG. 3, and having gap or slit widths of 0.35 mm. and a pressure differential of 200 to 250 mm. of water column, the waste gas can be cleaned to a uranium content of less than $0.5 \times 10^{-11}$ microcuries per cubic centimeter. A compressed air atomizing nozzle through which water can be ejected is arranged in advance of the separator. The separated uranium-containing gas constituents are present in the apparatus as condensates. The amount is less than 1 liter per 1000 cubic meters of gas. It is relatively simple to flush this condensate out of the filter and to add it to the bulk uranium.

The advantage of the invention apparatus is not limited to its higher separating power, but the invention is also advantageous in that it provides for easy complete recovery of the separated substances. In cleaning gases with a circulation of liquid, not only the filter but also the pump and the entire liquid cycle elements have to be cleaned after each charge in order that the separated solids can be combined with the bulk of the uranium.

*Example 2*

Wastes of an alloy of highly concentrated uranium and aluminum were dissolved in soda lye for preparation. The hydrogen evolved is cleaned in a filter embodying the invention, particularly the embodiment of FIGS. 1 and 2, in order to recover suspended uranium. The radioactivity of the waste gases was less than $0.5 \times 10^{-11}$ microcuries per cubic centimeter.

*Example 3*

Pyrophoric uranium was treated with oil in a grinding machine with intensive rinsing. About 3 cubic meters per minute of grinding mist are discharged from the covered machine. Up to this time, such waste gases were cleaned by a series arrangement of coarse-, fine- and very fine-pored laminated filters. Since the usual separation of oil is insufficient, the laminated filter became smeared after a very short time of use. With the invention apparatus, it is possible to obtain a waste gas having a solids content of less than $7 \times 10^{-11}$ microcuries per cubic centimeter with a pressure differential of 250 mm. of water column and a slit width of less than 1.2 mm. From the apparatus there is discharged an oil that is colored black by the uranium particles. There is no clogging and subsequent cleaning with very fine-pored laminated filters is possible with the apparatus since the gas is now practically oil-free.

*Example 4*

Waste gases of a sulfuric acid plant were cleaned in parallel test filters. One filter contained a cylindrical filter element embodying the invention as shown in FIGS. 1 and 2, and with slit widths of 0.6 mm. A second filter contained a gas filter candle with wall thickness of 10 mm. and a mean pore size of less than 0.1 mm. The filter candle was clogged after one week, to the extent that hardly any gas could pass therethrough. On the other hand, in the invention filter, neither the gas flow nor the gas resistance changed during the operation. With a pressure differential of 150 mm. of water column, the acid content as $SO_3$, after the filter candle, was 1.28 grams per cubic meter, whereas that following the invention apparatus was only 0.66 gram per cubic meter.

In another sulfuric acid plant, 25,000 cubic meters per hour of waste gases were cleaned to less than 0.09 gram of $SO_3$ per cubic meter with a separator as shown in FIGS. 4 and 5. The waste gases were practically invisible, and the energy expenditure of the blower for producing the pressure differential was 15 kilowatts.

*Example 5*

The acid waste gases of a pickling plant are conducted through a wash tower, but the action of the tower is insufficiently effective so that the discharge gases still contain unacceptable amounts of acid. By adding small quantities of gaseous $NH_3$ ahead of the wash tower, it is possible to neutralize the gases but the gases discharged from the wash tower still contain a clearly visible white mist. With the apparatus of the invention, it is possible to eliminate this mist almost completely with a pressure differential of less than 400 mm. of water column. Even with a slit width of up to 3 mm., an only slightly visible or practically mist-free end product is obtained.

*Example 6*

Aluminum-containing light metal is smelted in a waste melt in a gas-fixed tubular rotary furnace. The liquid metal is covered by a salt melt. The waste gases, which contain salt particles in addition to acid vapors, are cooled in a wash tower from which is discharged a thick mist which is objectionable for the vicinity. Tests with various known mechanical separators were unsuccessful even with a pressure differential of up to 800 mm. of water column, because a large portion of the mist particles has a diameter of less than $10^{-4}$ cm. An electrical precipitator would be extremely expensive because of the corrosion problem. With the apparatus of the invention, and using structural elements of polyethylene, it is possible to precipitate the mist practically completely with a pressure differential of less than 300 mm. of water column and a slit width of 0.5 mm.

If oils or other substances enter the tubular rotary furnaces with the metal waste, mists are formed which yield a tar-like viscous condensate. Clogging of the slits of the invention apparatus can be prevented by injecting water into the gas in advance of their entering the filter elements, utilizing a compressed air atomizer and using a suitable wetting agent, such as a sulfonated oil, for cleaning oil impurities. Acid proof wetting agents produce, on those polyethylene surfaces forming the slits, a continuous liquid film which improves the separation of the mist and which prevents impurities from sticking to the plastic. If the slits become clogged with tar-like substances, due to insufficient injection of water, such clogging can be rapidly eliminated during operation by a brief injection of solvents such as, for example, light oil.

While specific embodiments of the invention have been shown and described in detail in order to illustrate the application of the principles of the invention, it will be understood that the invention may be embodied otherwise without departing from such principles.

What is claimed is:

1. Apparatus for separating suspended substances from a gas current under a pressure differential of at least 30 mm. of water column, said apparatus comprising at least one hollow body extending longitudinally of the gas flow path and positioned in the gas current, said body being formed by juxtaposed similar closed annular structural elements which constitute the wall of said body and are arranged with the axial end edges of adjacent elements spaced apart from one another in the longitudinal axial direction of the hollow body to form parallel annular slots between said axial end edges which, in axial section of the hollow body, form sharply curved paths having angularly related annular gas entry and annular gas exit sections and a constriction at the sharpest curvature to impart a single abrupt change in direction to annular gas streams flowing therethrough.

2. Apparatus for separating suspended substances from a gas current, as claimed in claim 1, in which the angular change in flow direction through the slots is from 30° to substantially 120°.

3. Apparatus for separating suspended substances from a gas current, as claimed in claim 1, in which the transverse width of each slot is from 0.3 mm. to 5 mm.

4. Apparatus for separating suspended substances from a gas current, as claimed in claim 3, in which the transverse width of each slot is from 0.3 mm. to 2 mm.

5. Apparatus for separating suspended substances from a gas current, as claimed in claim 1, in which each slot has a decreasing width at its gas entry section and an increasing width at its gas exit section.

6. Apparatus for separating suspended substances from a gas current, as claimed in claim 1, in which the transverse width of each constriction is from 0.3 mm. to 5 mm.

7. Apparatus for separating suspended substances from a gas current, as claimed in claim 1, in which the flow section of each slot changes uniformly throughout the flow length of each slot, the surfaces of the slots being smooth.

8. Apparatus for separating suspended substances from a gas current, as claimed in claim 1, in which the annular gas entry section of each slot converges uniformly to said constriction, and the annular gas exit section of each slot diverges uniformly from the constriction.

9. Apparatus for separating suspended substances from a gas current, as claimed in claim 8, in which the change in flow direction in each slot is related to the flow velocity of the gas currents in such a manner that the centrifugal acceleration at the intersection of the gas entry and gas exit section is at least 6000 $g$ (m./sec.$^2$), wherein the expression $g$ (m./sec.$^2$) is the acceleration due to gravity measured in meters per second per second.

10. Apparatus for separating suspended substances from a gas current, as claimed in claim 9, in which such centrifugal acceleration is from 9000 to 110,100 $g$.

11. Apparatus for separating suspended substances from a gas current, as claimed in claim 1, including liquid injection means in advance of the hollow bodies for injecting liquid into the gas current.

12. A method for separating suspended substances from a gas current, comprising the steps of applying to the gas current a pressure differential of at least 30 mm. of water column while confining the gas to flow through annular slots of at least one hollow body, effecting a single abrupt change in the flow direction of the gas through said annular slots and constricting the flow area during such single abrupt change in the flow direction.

13. A method for separating suspended substances from a gas current, as claimed in claim 12, in which the suspended substances are radioactive.

14. A method for separating suspended substances from a gas current, as claimed in claim 12, in which the gas initially contains dusts formed by cooling of gaseous substances.

15. A method for separating gaseous substances from a gas current, comprising adding a reaction gas to the gas current to react with the gaseous substances to form solid or liquid suspended substances, applying to the gas current a pressure differential of at least 30 mm. of water column while confining the gas to flow through annular slots of at least one hollow body, effecting a single abrupt change in the flow direction of the gases through such annular slots and constricting the flow area during such single abrupt change in the flow direction.

16. A method for cleaning radioactive wastes from a gas current, comprising the steps of applying to the gas current a pressure differential of at least 30 mm. of water column while confining the gas to flow through annular slots of at least one hollow body, effecting a single abrupt change in the flow direction of the gas through said annular slots and constricting the flow area during such single abrupt change in the flow direction.

References Cited

UNITED STATES PATENTS

| | | | |
|---|---|---|---|
| 428,067 | 5/1890 | Briggs | 55—445 |
| 1,519,428 | 12/1924 | Wilisch | 55—443 X |
| 2,074,505 | 3/1937 | Goldstein | 55—442 |
| 2,506,273 | 5/1950 | Linderoth | 55—444 X |
| 3,190,058 | 6/1955 | Farr et al. | 55—442 X |

EARL C. THOMAS, *Primary Examiner.*